HORIZONTAL DEFLECTION LINEARITY CONTROL CIRCUIT
Filed March 19, 1965
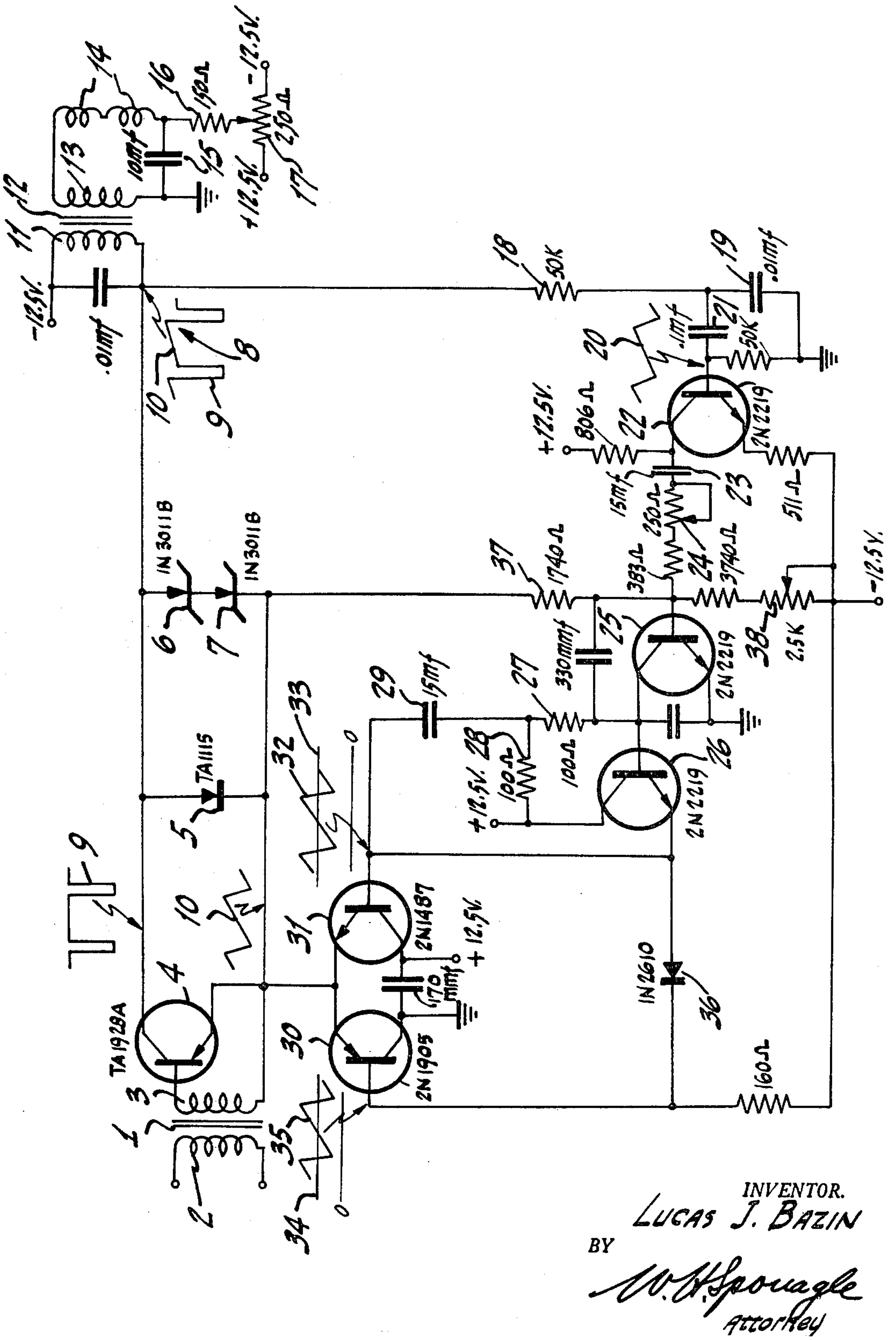
INVENTOR.
LUCAS J. BAZIN
BY
W. H. Spouagle
Attorney

United States Patent Office 3,398,318

Patented Aug. 20, 1968

3,398,318

HORIZONTAL DEFLECTION LINEARITY CONTROL CIRCUIT

Lucas J. Bazin, Stratford, N.J., assignor to Radio Corporation of America, a corporation of Delaware Filed Mar. 19, 1965, Ser. No. 441,254
4 Claims. (Cl. 315—27)

ABSTRACT OF THE DISCLOSURE

This circuit provides linear electromagnetic deflection of the scanning electron beam of a television camera image pickup tube. The pulsating deflection voltage wave applied to the primary of the deflection output transformer, having the yoke coupled to the secondary, is integrated to form a sawtooth wave at a relatively low level. The sawtooth wave is amplified and added to the pulsating wave to provide the necessary linearizing component. In the amplifier a linearity potentiometer controls the peak-to-peak amplitude of the sawtooth wave for linearizing purposes. Also, the amplifier is biased by a size control potentiometer to vary the DC level of the sawtooth component of the deflection wave and, thus, the deflection amplitude. The linearity and size controls operate independent of one another with no interaction.

This invention relates to electromagnetic deflection systems and particularly to the control of deflection linearity.

In any system for electromagnetically deflecting an electron beam in a cathode ray device, particularly at the horizontal line scanning rates in a television system, it is customary to impress upon the deflection apparatus a control voltage which is essentially pulsating in form. Such pulses are effective to produce a substantially sawtooth current through the primarily inductive electromagnetic deflection apparatus. In every case, however, the electron beam deflection is not entirely linear because the circuit also is somewhat resistive. Accordingly, it also is customary to add a sawtooth voltage component to the pulsating voltage wave for the purpose of improving the deflection linearity. In many cases the sawtooth voltage component is added at a point in the circuit at or close to the deflection yoke itself. The deflection controlling waveform at such a point necessarily is at a relatively high level. Also, if centering of the raster scanned by the electron beam is to be accomplished by conducting direct current through the deflection yoke, additional apparatus such as choke coils are required for isolation purposes. Furthermore, it ordinarily is desired to effect deflection linearity and raster size (or deflection amplitude) control at a relatively low signal level. In prior art systems in which the linearizing sawtooth voltage wave is added at the deflection yoke itself, this voltage is at a relatively high level and the linearity and size controls must be capable of handling relatively large currents.

It, therefore, is an object of the present invention to provide improved linearity of electromagnetic deflection of an electron beam.

Another object of the invention is to provide an improved electromagnetic beam deflection system having linearity control and in which the linearity and amplitude controls may be adjusted independently without mutual interaction.

In accordance with the present invention, the linearity controlling sawtooth component of the deflection controlling voltage wave is introduced in the primary winding circuit of a deflection output transformer having a secondary winding to which the deflection yoke is connected. The pulse component of the deflection controlling wave is converted to a sawtooth wave which is amplified. Positive- and negative-going portions of the sawtooth wave are separately combined with the pulsating component of the deflection control wave respectively by two alternately conducting devices. A suitable feedback circuit is employed to insure that there is no interruption or discontinuity in the application of the opposite polarity portions of the sawtooth wave as applied to the deflection circuit. Deflection linearity is controlled by regulating the peak-to-peak amplitude of the sawtooth wave and size or amplitude of the deflection is controlled by regulating the DC level at which the sawtooth wave component is combined with the pulse component.

For a better understanding of the invention, reference now will be made to the following description of an illustrative embodiment thereof shown in the single figure of the accompanying drawing.

The deflection circuit includes an input transformer 1 which couples pulses at the repetition rate of the desired deflection applied to the transformer primary winding 2. In the illustrative embodiment of the invention, the line or horizontal deflection rate of a television system is assumed. Similar pulses developed in the secondary winding 3 of the input transformer 1 are impressed upon the base and emitter electrodes of a driver transistor 4 which as illustrated is a PNP type. The usual damper diode 5 is connected between the collector and emitter electrodes of the transistor 4. Also, a series arrangement of two Zener diodes 6 and 7 are connected between the collector and emitter electrodes of the driver transistor 3 so as to protect the transistor from undesired transient voltages which might damage the transistor.

The composite deflection controlling voltage wave 8 consists essentially of a pulse component 9 which is developed at the collector electrode of the driver transistor 4 and produced by inductive reaction when the transistor is rendered nonconducting by the input pulses. The wave 8 also has a sawtooth component 10 which is developed at the emitter electrode of the transistor 4 by the apparatus embodying the present invention in a manner to be described subsequently. The sawtooth component 10 is combined with the pulse component 9 at the collector electrode of the transistor 4 during its conducting periods. The voltage wave 8 is impressed upon the primary winding 11 of an output transformer 12 which has a secondary winding 13 across which the deflection yoke 14 is connected. The secondary winding circuit of the output transformer 12 also includes a blocking capacitor 15 so that direct current may be circulated through the yoke 14 for centering purposes. This direct current is applied to the yoke through a current limiting resistor 16 and is derived from a potentiometer 17 connected to a source of voltage as indicated.

The linearizing apparatus embodying the invention is connected between the primary winding 11 of the output transformer 12 and the emitter electrode circuit of the driver transistor 4. The pulsating component 9 of the deflection voltage wave 8 is integrated by a circuit including the series arrangement of a resistor 18 and a capacitor 19 connected to the output transformer primary winding 11. As a result of such integration a substantially sawtooth wave 20 is produced. This wave is impressed by a capacitor 21 upon the base electrode of a first sawtooth wave amplifying transistor 22. This transistor also serves as isolation so as to present a relatively high impedance to the integrating circuit and, thus, enable the production of a good sawtooth wave 20. An amplified version of the sawtooth wave 20 developed at the collector electrode of the transistor 22 is impressed by means including a series arrangement of a capacitor 23 and a linearity controlling potentiometer 24 to the base electrode of a second amplifier transistor 25. The transistor 25 and a similar transistor 26 serve to additionally amplify the sawtooth and to drive sawtooth wave output apparatus. The collector electrode of the transistor 25 is connected to a voltage supply through a series arrangement of two load resistors 27 and 28 so as to produce an additionally amplified version of the sawtooth wave 20 which is applied to the base electrode of the transistor 26. Thus, an amplified version of the sawtooth wave is obtained from the emitter electrode of the transistor 26. The combination of transistors 25 and 26 also includes a boot strap type of feedback circuit provided by a capacitor 29 connected between the emitter electrode of the output transistor 26 to the junction point between the two load resistors 27 and 28. Such a feedback arrangement increases the effective resistance of the resistor 28, whereby the gain of the amplifier is increased.

The sawtooth wave developed at the emitter electrode of the amplifier transistor 26 is applied at two different DC levels, respectively, to the base electrodes of two output transistors 30 and 31. These transistors are of opposite conductivity, the transistor 30 being of PNP type and the transistor 31 being of an NPN type. They are used as emitter followers, the respective emitter electrodes being connected to the emitter electrode circuit of the driver transistor 4. Being of opposite conductivity types, the respective base-to-emitter drops of the transistors 30 and 31 are slightly different, that of the transistor 31 being greater than that of transistor 30. Consequently, the sawtooth wave 32 applied to the base of the transistor 31 is at a slightly higher DC level 33 than the DC level 34 at which the sawtooth wave 35 is impressed upon the base electrode of the transistor 30 by means of a diode 36. The drop across the diode in its conducting state is approximately equal to the difference between the base-to-emitter drops of the transistors 30 and 31. The peak-to-peak amplitudes of the sawtooth waves 32 and 35, nevertheless, are substantially equal.

The sawtooth wave component 10 of the deflection voltage wave 8 is added to this wave in the following manner. During approximately one-half of the deflection cycle when the driver transistor 4 is conducting and the damper diode 5 is not conducting, positive-going half cycles of the sawtooth wave 32 are added to the deflection circuit while transistor 31 is conducting. During the other half of a deflection cycle in which the driver transistor 4 is not conducting and the damper diode 5 is conducting, negative-going half cycles of the sawtooth wave 35 are added while the transistor 30 is conducting. Thus, by virtue of the alternate conduction of the driver transistor 4 and the damper diode 5 and the alternate conduction of the transistors 31 and 30, a complete sawtooth voltage wave component 10 is added to the deflection wave 8. In the event that, by reason of the alternate conduction of the transistors 30 and 31, the complete sawtooth wave component 10 does not have a smooth transition on its long ramp portion, for example, there is provided a negative feedback circuit including a resistor 37 connected from the emitter electrode circuit of the driver transistor 4 to the base of the amplifier transistor 25. By such an arrangement, the sawtooth wave input to the transistor 25 is suitably distorted in an opposite sense to rectify any tendency for the output sawtooth wave component 10 to be distorted.

As previously described, an adjustment of the potentiometer 24 controls the linearity of the electron beam deflection by regulating the peak-to-peak amplitude of the sawtooth wave component 10. The circuit also includes a size control potentiometer 38 connected from a source of voltage to the base electrode of transistor 25 so as to establish the DC operating level of this transistor. An adjustment of the potentiometer 38 operates as a size or width control in the following manner. The amplitude of horizontal beam deflection produced under the control of the wave 8 depends upon the voltage developed across the output terminals of the driving transistor 4 which are the collector and emitter electrodes. This voltage is a function of the fixed negative voltage to which the primary winding 11 of the output transformer 12 is connected and the variable DC level voltage of the sawtooth waves 32 and 35.

As previously described, the DC level of the sawtooth wave component 10 depends upon the biasing of the various transistors including the biasing applied to the base electrode of transistor 25. In the event that it is desired to increase the width of the scanned raster, for example, an appropriate adjustment of the size control potentiometer 38 is made to raise the operating level of the transistor 25 and thereby the DC level of the sawtooth wave component 10. The result of such an operation is to increase the overall amplitude of the composite wave 8 which is applied to the primary winding 11 of the output transformer 12. The application of a wave 8 of increased amplitude to the deflection circuit requires an increased linearity correction. In the present system, this correction is essentially automatic by reason of the fact that the linearity correcting sawtooth wave is derived by integrating the wave 8. Consequently, any increased overall amplitude of the wave 8 results in the production of a sawtooth wave 20 which has a greater peak-to-peak amplitude. The normal operation of the linearity control circuit, without further adjustment of the potentiometer 24, results in the production of a sawtooth wave component 10 of sufficiently increased amplitude that, when made a part of the composite wave 8, the necessary linearity compensation is automatically achieved. In the event that a raster of smaller size is desired a suitable adjustment of the size control potentiometer 38 is made to reduce the overall amplitude of the wave 8 which, when integrated produces a smaller amplitude sawtooth wave 20, and the linearity compensation is achieved automatically. In such a system no readjustment of the linearity potentiometer 24 is required to effect the desired linearity compensation when an adjustment of the size control potentiometer 38 is made.

In the described circuit, the peak-to-peak amplitude of the sawtooth wave component 10 is independent of the level at which this wave is supplied to the deflection circuit. This level is set by the adjustment of the size control potentiometer 38. An adjustment of the linearity control potentiometer 24 merely adjusts the peak-to-peak amplitude of the sawtooth wave 10 for the purpose of achieving the desired linearity compensation. This does not significantly change the overall amplitude of the deflection control wave 8 and as a consequence the horizontal width or size of the raster scanned does not change.

Thus, it is seen that the circuit embodying the present invention enables the completely independent adjustments of deflection linearity and size. At the same time, both linearity and size controls are achieved at a relatively low signal level, thereby obviating the need for cumbersome and costly apparatus such as control potentiometers.

What is claimed is:

1. In an electromagnetic beam deflection system including a yoke, the combination comprising:

a deflection yoke;

an output stage for energizing said yoke by a driving wave including primarily a pulse component occurring during retrace intervals of a deflection cycle;

first means coupling said output stage to said yoke;

second means coupled to said first means for converting said driving wave into a sawtooth wave;

deflection linearity control means coupled to said second means for controlling the peak-to-peak amplitude of said sawtooth wave;

raster size control means coupled to said linearity con-control means for varying the DC level of said sawtooth wave;

amplifying means coupled to said raster size control means for amplifying said sawtooth wave; and means coupled between said amplifying means and said output stage for adding said sawtooth wave to said driving wave during the trace interval of said deflection cycle.

2. In an electromagnetic beam deflection system including an output transformer having primary and secondary windings and a yoke coupled to said secondary winding, the combination comprising:

driver means operative during substantially one-half of each trace interval of a deflection cycle to apply to said primary transformer winding a driving wave including primarily a pulse component occurring during said retrace intervals;

damper means coupled to said driver means and to said primary transformer winding and operative during substantially a second half of each of said trace intervals;

means to convert the pulse component of said driving wave into a sawtooth wave;

first and second amplifier transistors each having input and output electrodes;

means including a linearity control potentiometer by which to vary the peak-to-peak amplitude of said sawtooth wave for impressing said sawtooth wave in one polarity upon the input electrode of said first amplifier transistor;

the input electrode of said second amplifier transistor being connected to the output electrode of said first amplifier transistor in such a manner that an amplified sawtooth wave of opposite polarity is developed at the output electrode of said second amplifier transistor at a given DC level;

a bootstrap circuit coupled from the output electrode of said second amplifier transistor to the output electrode circuit of said first amplifier transistor to effectively increase the gain of said first amplifier transistor;

output transistor means having input and output electrodes, means for coupling the output electrode of said second amplifier transistor to the input electrode of said output transistor means to impress said amplified sawtooth wave upon said output transistor means;

means coupling the output electrode of said output transistor means to said driver means to add positive-going half cycles of said amplified sawtooth wave to said deflection driving wave during operative periods of said driver means and negative-going half cycles of said amplified sawtooth wave to said deflection driving wave during operative periods of said damper means; and means including a size control potentiometer coupled to the input electrode of said first amplifier transistor to adjust the operating level of said first amplifier transistor, thereby varying the DC level of the sawtooth component of the deflection driving wave and, thus, the size of the raster scanned by the deflected electron beam.

3. In an electromagnetic beam deflection system including an output transformer having primary and secondary windings and a yoke coupled to said secondary winding, the combination comprising:

a driver transistor having base, emitter and collector electrodes;

means for rendering said driver transistor alternately conducting and non-conducting, respectively, during trace and retrace intervals of a deflection cycle;

means connecting the collector electrode of said driver transistor to said primary transformer winding, whereby to apply to said winding a driving wave including primarily a pulse component occurring during said retrace intervals;

a damper diode connected between the collector and emitter electrodes of said driver transistor in a manner to be rendered alternately conducting and non-conducting, respectively, during said retrace and trace intervals;

an integrating circuit coupled to said primary transformer winding to convert the pulse component of said driving wave into a sawtooth wave;

first and second amplifier transistors each having base, emitter and collector electrodes;

means for impressing said sawtooth wave upon the base electrode of said first amplifier transistor;

means coupling the collector electrode of said first amplifier transistor to the base electrode of said second amplifier transistor, said coupling means including a linearity control potentiometer by which to vary the peak-to-peak amplitude of said sawtooth wave;

load means connected to the collector electrode of said second amplifier transistor;

a third amplifier transistor having base, emitter and collector electrodes;

the base electrode of said third amplifier transistor being connected to the collector electrode of said second amplifier transistor, whereby an amplified sawtooth wave is developed at the emitter electrode of said third amplifier transistor at a given DC level;

bootstrap means coupled from the emitter electrode of said third amplifier transistor to an intermediate point of said load means to effectively increase said load means and hence the gain of said second amplifier transistor;

a pair of opposite conductivity types of output transistors, each having base, emitter and collector electrodes, the respective base-to-emitter voltage drops of said output transistors being different from one another;

means for directly coupling the emitter electrode of said third amplifier transistor to the base of a first one of said output transistors to impress said amplified sawtooth wave upon said first output transistor at a first DC level;

means including a voltage-dropping component coupling the emitter electrode of said third amplifier transistor to the base of a second one of said output transistors to impress said amplified sawtooth wave upon said second output transistor at a second DC level lower than said first DC level;

means coupling the emitter electrodes of said two output transistors to the emitter electrode of said driver transistor to add positive-going half cycles of said amplified sawtooth wave to said deflection driving wave during conduction intervals of said driver transistor and said first output transistor and negative-going half cycles of said amplified sawtooth wave to said deflection driving wave during conduction intervals of said damper diode and said second output transistor;

feeback means connected between the emitter electrode of said driver transistor and the base electrode of said second amplifier transistor to provide a negative feedback, whereby to correct any distortions of said amplified sawtooth wave; and means including a size control potentiometer coupled to the base electrode of said second amplifier transistor to adjust the operating level of said second amplifier transistor, thereby varying the DC level of the sawtooth component of the deflection driving wave and, thus, the size of the raster scanned by the deflected electron beam.

4. In an electromagnetic beam deflection system including an output transformer having primary and secondary windings and a yoke coupled to said secondary winding, the combination comprising:

a driver transistor having base, emitter and collector electrodes;

means for applying pulses to the base electrode of said driver transistor to render said driver transistor alternately conducting and non-conducting, respectively, during trace and retrace intervals of a deflection cycle;

means connecting the collector electrode of said driver transistor through said primary transformer winding to a power supply, whereby to apply to said winding a driving wave including primarily a pulse component occurring during said retrace intervals;

a damper diode connected between the collector and emitter electrodes of said driver transistor in a manner to be rendered alternately conducting and nonconducting, respectively, during said retrace and trace intervals;

an integrating circuit including a resistor and a capacitor coupled to said primary transformer winding to convert the pulse component of said driving wave into a sawtooth wave;

first and second amplifier transistors each having base, emitter and collector electrodes;

means for impressing said sawtooth wave upon the base electrode of said first amplifier transistor;

means coupling the collector electrode of said first amplifier transistor to the base electrode of said second amplifier transistor, said coupling means including a series-connected linearity control potentiometer by which to vary the peak-to-peak amplitude of said sawtooth wave;

resistive load means connected between the collector electrode of said second amplifier transistor and a power supply;

a third amplifier transistor having base, emitter and collector electrodes;

the base electrode of said third amplifier transistor being connected to the collector electrode of said second amplifier transistor, whereby an amplified sawtooth wave is developed at the emitter electrode of said third amplifier transistor at a given DC level;

a bootstrap capacitor coupled from the emitter electrode of said third amplifier transistor to the midpoint of said resistive load means to effectively increase said load means and hence the gain of said second amplifier transistor;

a pair of opposite conductivity types of output transistors, each having base, emitter and collector electrodes, the respective base-to-emitter voltage drops of said output transistors being different from one another;

means for directly coupling the emitter electrode of said third amplifier transistor to the base of a first one of said output transistors to impress said amplified sawtooth wave upon said first output transistor at a first DC level;

means including a diode coupling the emitter electrode of said third amplifier transistor to the base of a second one of said output transistors to impress said ampified sawtooth wave upon said second output transistor at a second DC level lower than said first DC level;

means coupling the emitter electrodes of said two output transistors to the emitter electrode of said driver transistor to add positive-going half cycles of said amplified sawtooth wave to said deflection driving wave during conduction intervals of said driver transistor and said first output transistor and negative-going half cycles of said amplified sawtooth wave to said deflection driving wave during conduction intervals of said damper diode and said second output transistor;

means including a resistor connected between the emitter electrode of said driver transistor and the base electrode of said second amplifier transistor to provide a negative feedback, whereby to correct any distortions of said amplified sawtooth wave; and means including a size control potentiometer coupled between the base electrode of said second amplifier transistor and a power supply to adjust the operating level of said second amplifier transistor, thereby varying the DC level of the sawtooth component of the deflection driving wave and, thus, the size of the raster scanned by the deflected electron beam.

References Cited

UNITED STATES PATENTS

| | | | |
|---|---|---|---|
| 3,070,727 | 12/1962 | Birt | 315—27 |
| 3,174,073 | 3/1965 | Massman et al. | 315—27 |
| 3,178,593 | 4/1965 | Diehl | 315—27 |
| 3,341,716 | 9/1967 | Chilton | 315—27 |

RODNEY D. BENNETT, *Primary Examiner.*

B. L. RIBANDO, *Assistant Examiner.*